United States Patent
Oldani (10) Patent No.: US 9,434,319 B2
(45) Date of Patent: Sep. 6, 2016

(54) PERSONAL ELECTRONIC DEVICE DOCK

(71) Applicant: Ford Global Technologies, LLC, Dearborn, MI (US)

(72) Inventor: Raymond Anthony Oldani, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/591,167

(22) Filed: Jan. 7, 2015

(65) Prior Publication Data

US 2016/0193968 A1  Jul. 7, 2016

(51) Int. Cl.
*B60R 7/06* (2006.01)

(52) U.S. Cl.
CPC ...................................... *B60R 7/06* (2013.01)

(58) Field of Classification Search
CPC . B60R 7/06; B60R 11/02; B60R 2011/0003; B60R 2011/0005; B60R 2011/0007; B60R 2011/0071; B60R 2011/0075; B60R 2011/0082; B60R 2011/0092; B60R 2011/0094; B60R 2011/0258; B60R 2011/0282
USPC ............................ 296/37.8, 37.12, 24.34, 70
See application file for complete search history.

(56) References Cited

U.S. PATENT DOCUMENTS

| | | | |
|---|---|---|---|
| 4,670,988 A | 6/1987 | Baxter | |
| 5,276,596 A | 1/1994 | Krenzel | |
| 5,779,205 A | 7/1998 | Ching | |
| 5,799,914 A | 9/1998 | Chivallier et al. | |
| 5,842,481 A | 12/1998 | King | |
| 5,988,572 A | 11/1999 | Chivallier et al. | |
| 6,062,518 A | 5/2000 | Etue | |
| 6,417,786 B2 | 7/2002 | Learman et al. | |
| 6,524,240 B1 | 2/2003 | Thede | |
| 6,539,358 B1 | 3/2003 | Coon et al. | |
| 6,633,482 B2 | 10/2003 | Rode | |

(Continued)

FOREIGN PATENT DOCUMENTS

| | | |
|---|---|---|
| DE | 202011004924 | 10/2011 |
| DE | 102010025563 | 12/2011 |

(Continued)

OTHER PUBLICATIONS

In-Car Mobile Mounting Brackets, Chargers and Ruggedised Technology Cases, ace, Nemesis GB Ltd., 4 pages, dated Jul. 17, 2012.

(Continued)

*Primary Examiner* — Gregory Blankenship
(74) *Attorney, Agent, or Firm* — Vichit Chea; Price Heneveld LLP (57) ABSTRACT

A portable electronic device dock includes a storage unit and a lid, wherein the lid is adapted to clamp a portable electronic device between a portion of the lid and a portion of the storage unit to retain the portable electronic device in a user-accessible display position. The device dock includes a slide assembly adapted to bias the lid to an open position and a clutch assembly adapted to retain the lid in a clamped position on the portable electronic device. A spring member retains the clutch assembly in a released condition as the lid opens. The slide assembly includes a release tab configured to act on the spring member to allow the clutch assembly to convert to an engaged condition once the lid has reached a fully open position.

20 Claims, 10 Drawing Sheets

(56) References Cited

U.S. PATENT DOCUMENTS

| | | | |
|---|---|---|---|
| 6,682,157 B2 * | 1/2004 | Ito | B60R 11/0235 312/319.2 |
| 7,062,300 B1 | 6/2006 | Kim | |
| 7,140,586 B2 | 11/2006 | Seil et al. | |
| 7,269,002 B1 | 9/2007 | Turner et al. | |
| 7,413,155 B2 | 8/2008 | Seil et al. | |
| 7,623,958 B1 * | 11/2009 | Laverick | B60R 11/0258 361/679.01 |
| 7,873,771 B2 | 1/2011 | Krueger et al. | |
| 7,930,004 B2 | 4/2011 | Seil et al. | |
| 7,930,006 B2 | 4/2011 | Neu et al. | |
| 7,931,505 B2 | 4/2011 | Howard et al. | |
| 7,933,117 B2 | 4/2011 | Howarth et al. | |
| 8,022,179 B2 * | 9/2011 | Dake | A61K 8/64 424/247.1 |
| 8,145,821 B2 | 3/2012 | Mead et al. | |
| 8,172,293 B2 * | 5/2012 | Lota | B60R 11/02 224/483 |
| 8,183,825 B2 | 5/2012 | Sa | |
| 8,242,906 B2 | 8/2012 | Fawcett | |
| 8,325,028 B2 | 12/2012 | Schofield et al. | |
| 8,376,595 B2 | 2/2013 | Higgins-Luthman | |
| 8,393,584 B2 | 3/2013 | Burns | |
| 8,492,698 B2 | 7/2013 | Schofield et al. | |
| 8,496,144 B2 | 7/2013 | Son | |
| 8,727,413 B2 | 5/2014 | Seiller et al. | |
| 8,910,990 B1 * | 12/2014 | Oldani | B60R 11/02 220/260 |
| 9,079,540 B2 * | 7/2015 | Harding | B60R 11/02 |
| 9,233,649 B2 * | 1/2016 | Bisceglia | B60R 11/02 |
| 2004/0023633 A1 | 2/2004 | Gordon | |
| 2005/0001105 A1 * | 1/2005 | Matsuda | B60K 37/06 248/27.1 |
| 2005/0014536 A1 | 1/2005 | Grady | |
| 2005/0023089 A1 * | 2/2005 | Okabayashi | B60R 7/06 188/82.2 |
| 2005/0045681 A1 | 3/2005 | Hancock et al. | |
| 2006/0052144 A1 | 3/2006 | Seil et al. | |
| 2007/0018064 A1 | 1/2007 | Wang | |
| 2007/0114974 A1 | 5/2007 | Grady | |
| 2007/0281619 A1 | 12/2007 | Chen | |
| 2008/0019082 A1 | 1/2008 | Krieger et al. | |
| 2008/0174136 A1 | 7/2008 | Welschholz et al. | |
| 2009/0174209 A1 * | 7/2009 | Lota | B60R 11/02 296/24.34 |
| 2009/0275362 A1 | 11/2009 | Tieman et al. | |
| 2010/0078536 A1 | 4/2010 | Galvin | |
| 2011/0121148 A1 | 5/2011 | Pernia | |
| 2011/0163211 A1 | 7/2011 | Cicco | |
| 2011/0259789 A1 * | 10/2011 | Fan | B60R 11/0258 206/701 |
| 2011/0263293 A1 | 10/2011 | Blake et al. | |
| 2012/0018473 A1 | 1/2012 | Da Costa Pito et al. | |
| 2012/0061983 A1 * | 3/2012 | Seiller | B60R 11/00 296/24.34 |
| 2012/0262868 A1 * | 10/2012 | Kato | B60R 11/0235 361/679.21 |
| 2012/0318796 A1 | 12/2012 | Doll | |
| 2013/0026889 A1 * | 1/2013 | Lee | F16M 11/046 312/7.2 |
| 2013/0043779 A1 | 2/2013 | Fan | |
| 2014/0131357 A1 * | 5/2014 | Hirama | B65D 51/243 220/260 |
| 2014/0153163 A1 * | 6/2014 | Harding | B60R 11/02 361/679.01 |
| 2014/0339847 A1 * | 11/2014 | Brunard | B60R 11/02 296/37.12 |
| 2014/0354002 A1 * | 12/2014 | Bisceglia | B60R 11/02 296/37.12 |
| 2015/0258943 A1 * | 9/2015 | Harding | B60R 11/02 296/37.12 |
| 2015/0350397 A1 * | 12/2015 | Vourlat | B60R 11/0235 455/575.9 |

FOREIGN PATENT DOCUMENTS

| | | |
|---|---|---|
| EP | 2124129 | 11/2009 |
| EP | 2431230 | 3/2012 |
| KR | 100895585 | 4/2009 |
| WO | 2009127439 | 10/2009 |
| WO | 2009143969 | 12/2009 |
| WO | 2010018011 | 2/2010 |
| WO | 2011047984 | 4/2011 |
| WO | 2011060963 | 5/2011 |

OTHER PUBLICATIONS

"Galaxy S III charting Dock, " iBolt.co, http://ibolt.co, 2 pages, Copyrighted 2012 iBolt Co.

"Top Cellet Vehicle Dash Phone Holder for Cell Phones & Smartphones," Rocky Case, 2 pages, Copyrighted 2013, www.rockycase.com.

* cited by examiner

PERSONAL ELECTRONIC DEVICE DOCK

FIELD OF THE INVENTION

The present invention generally relates to a device dock for a portable electronic device, and more particularly, to a portable electronic device dock adapted to be disposed within an instrument panel of a motor vehicle having an automated opening feature with a selectively engageable clutch.

BACKGROUND OF THE INVENTION

Portable devices are widely used and becoming commonplace in a variety of settings. One particular setting involves use of such devices inside a traveling vehicle to assist the vehicle occupants and enhance a trip experience. Popular portable devices often include navigation units and mobile cellular devices having navigation software. Power for such mobile devices may be accommodated through a vehicle's preexisting power supply input such as a cigarette lighter or an auxiliary power port. The portable device is then, often times, placed in the vehicle console, on an instrument panel or on a dashboard where the portable device is not properly secured and not easily accessible or visible to vehicle occupants. Further, the power cables necessary to run the portable device are often loose and unsightly. Known portable device holders are often complex in nature for the positioning and retention of a portable device therein. Thus, it is desirable to provide an adjustable portable electronic device holder that compliments a vehicle spatial interior while providing features that facilitate the loading and unloading of the portable electronic device.

SUMMARY OF THE INVENTION

One aspect of the present invention includes a device dock, having a storage compartment with a pivoting lid. A slide assembly is operably coupled to the lid and includes a release tab disposed thereon. A clutch assembly is gearingly engaged with the slide assembly and includes a release sleeve. A spring member is operable between engaged and released positions relative to the release sleeve, wherein the spring member is moved to the released position by the release tab when the lid is moved to a fully open position.

Another aspect of the present invention includes a device dock having a storage compartment with a lid that is operable between open, closed and clamped positions. A slide assembly is operably coupled to the lid. A clutch assembly is gearingly engaged with the slide assembly and convertible between engaged and released conditions. A spring member is operable between engaged and released positions with the clutch assembly, wherein the spring member retains the clutch assembly in the released position as the lid moves to the open position.

Yet another aspect of the present invention includes a device dock having a storage compartment with a slide assembly which is operably coupled to a lid. The slide assembly includes a release tab. A clutch assembly is operably coupled to the slide assembly and the clutch assembly is operable between engaged and released conditions. The clutch assembly includes a release sleeve and is configured to retain the lid in a clamped position on an electronic device when in the engaged condition. A spring member is operably coupled to the storage compartment and includes an arm with a notch disposed on an engagement end thereof. The engagement end is operably between engaged and released positions and configured to retain the clutch assembly in the released condition as the lid is moved to a fully open position. The engagement end is moved from the engaged position to the released position by the release tab of the slide assembly when the lid is moved to the fully open position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
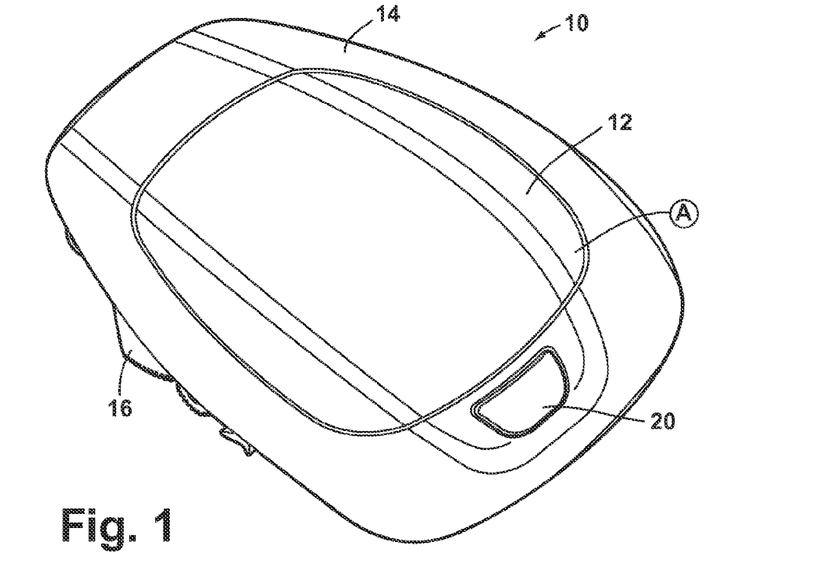
FIG. 1 is a top perspective view of a portable electronic device dock having a lid in a closed position according to one embodiment of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
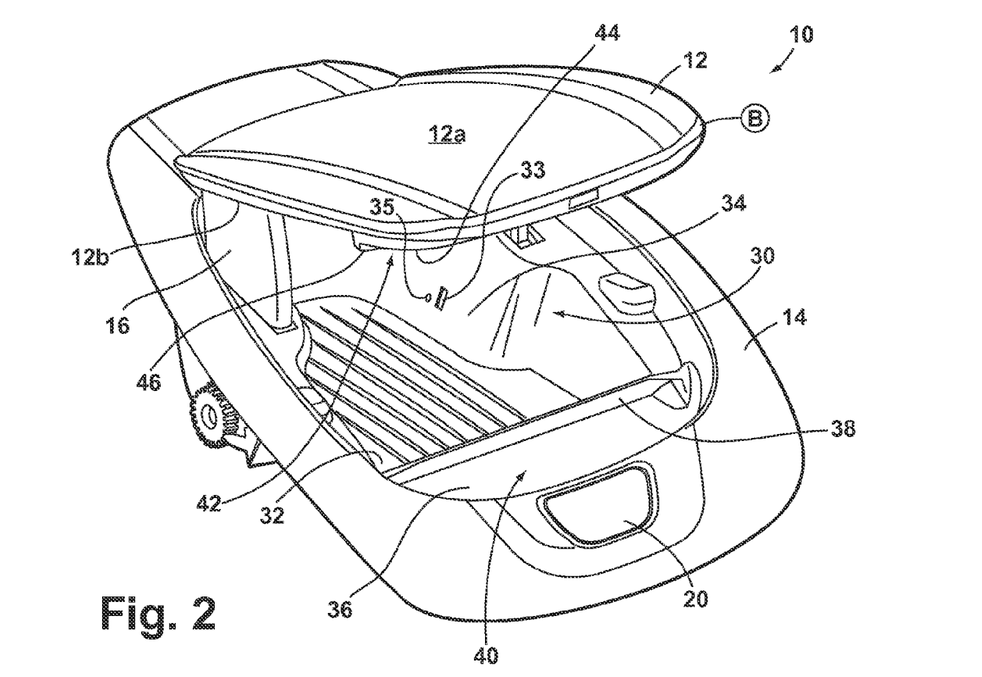
FIG. 2 is a top perspective view of the portable electronic device dock of FIG. 1 having the lid in an open position.

Referring now to FIG. 1, a portable electronic device dock is generally indicated by reference numeral 10. The device dock, 10 is adapted to be secured in an instrument panel or dashboard of a motor vehicle interior as further described below with reference to FIGS. 10 and 11. The device dock 10 includes a lid 12 which is hingedly connected to a housing 14 by a pair of support arms 16, 18 as best shown in FIG. 4. The device dock 10 further includes an actuator assembly 150 (FIG. 8A) having an actuator button 20. In use, the actuator assembly 150 is adapted to release the lid 12 from the closed position A, shown in FIG. 1, for movement towards a fully open position B, as shown in FIG. 2 and further described below. Thus, the lid 12 is operable between the closed position A (FIG. 1) and the open position B (FIG. 2), and it is contemplated that the lid 12 is biased towards the open position B by a biasing mechanism. As biased by the biasing mechanism, the lid 12 is configured to automatically move to the open position B when the lid 12 is released by actuating or pressing the actuator button 20 from the closed position A as further described below.

Figure 3:
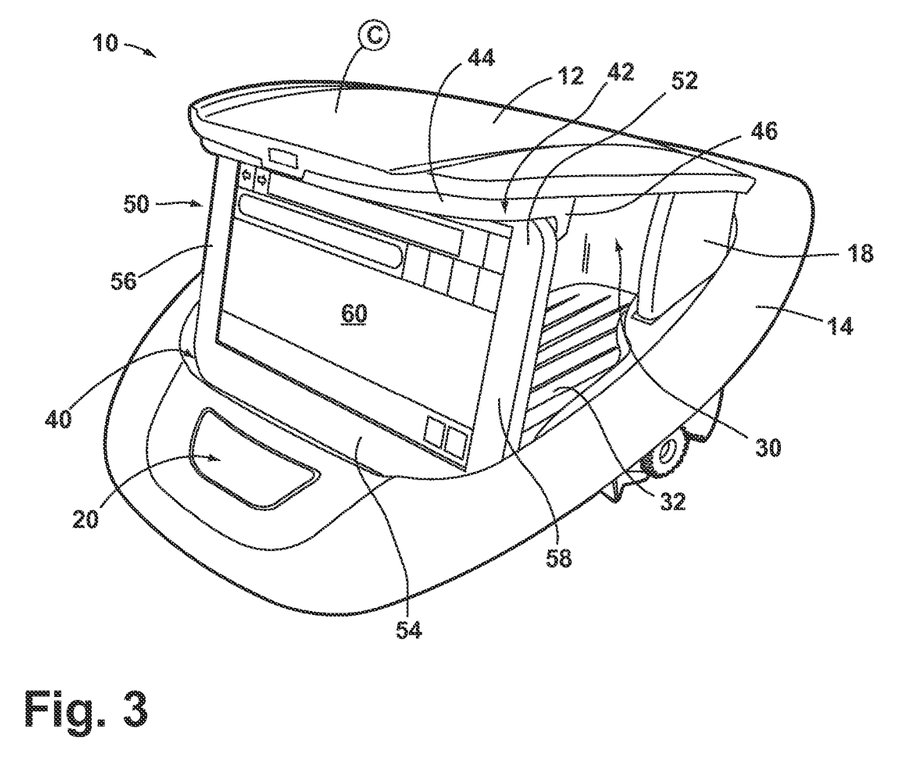
FIG. 3 is a top perspective view of the portable electronic device dock of FIG. 2 having a portable electronic device secured therein.

Referring now to FIG. 2, the device dock 10 is shown with the lid 12 in an open position B, which is better described as a fully open position. When the lid 12 is in the fully open position B, a storage compartment 30 is revealed and accessible to a vehicle occupant. The storage compartment 30 may be integrally formed with the housing 14 and includes a bottom wall 32 and a wraparound side wall 34 extending upwardly from the bottom wall 32. As shown in the embodiment of FIG. 2, the storage compartment 30 further includes connection ports, such as a USB port 33 and an audio port 35 which allow for an electronic device to integrate or interface with an existing electrical system of a vehicle, to possibly charge the electronic device, or to play music from the electronic device through the vehicles audio system. The storage compartment 30 further includes a front landing 36 disposed adjacent to a vertically extending wall 38, such that the landing 36 and the wall 38 in combination define a lower cradle or guide 40 adapted to receive a lower portion of a portable electronic device when placed in the device dock 10, as shown in FIG. 3. Similarly, the lid 12 includes an upper side 12a and an underside 12b, wherein the front portion of the underside 12b includes an upper cradle or guide 42 having a generally horizontal landing portion 44 disposed adjacent to a downwardly extending member 46. In assembly, the upper and lower cradles or guides 42, 40 are adapted to receive a portable electronic device in a clamping jaw-like manner to retain the portable electronic device in a display position in the device dock 10 as further described below. It is contemplated that the cradles 42, 40 may be comprised of a non-slip compressible material to better clamp an portable electronic device therein in a slip-free manner. The device dock 10 of the present invention is adapted to clamp to portable electronic devices of varying sizes in either a landscape mode (shown in FIG. 3) or in a rotated portrait mode as well.

Referring now to FIG. 3, a portable electronic device 50 is shown as received in the device dock 10. The portable electronic device 50 includes upper and lower portions 52, 54 and side portions 56, 58 which surround a display screen 60. The portable electronic device 50 is shown in FIG. 3 as a mobile phone secured in a landscape display position within the device dock 10. Specifically, the portable electronic device 50 is received in the upper cradle 42 of the device dock 10 at the upper portion 52 of the portable electronic device 50, and further received in the lower cradle 40 of the device dock 10 at the lower portion 54 of the electronic device 50. As further shown in FIG. 3, the lid 12 of the device dock 10 is in a clamped position C, thereby securing the portable electronic device 50 in the device dock 10 in the landscape display position. It is contemplated that the portable electronic device 50 may be any type of electronic device for use with the present invention, such as a navigation device, a digital music player, a DVD player, a mobile phone or any other such device that a vehicle occupant desires for ready access and visibility.

Figure 4A:
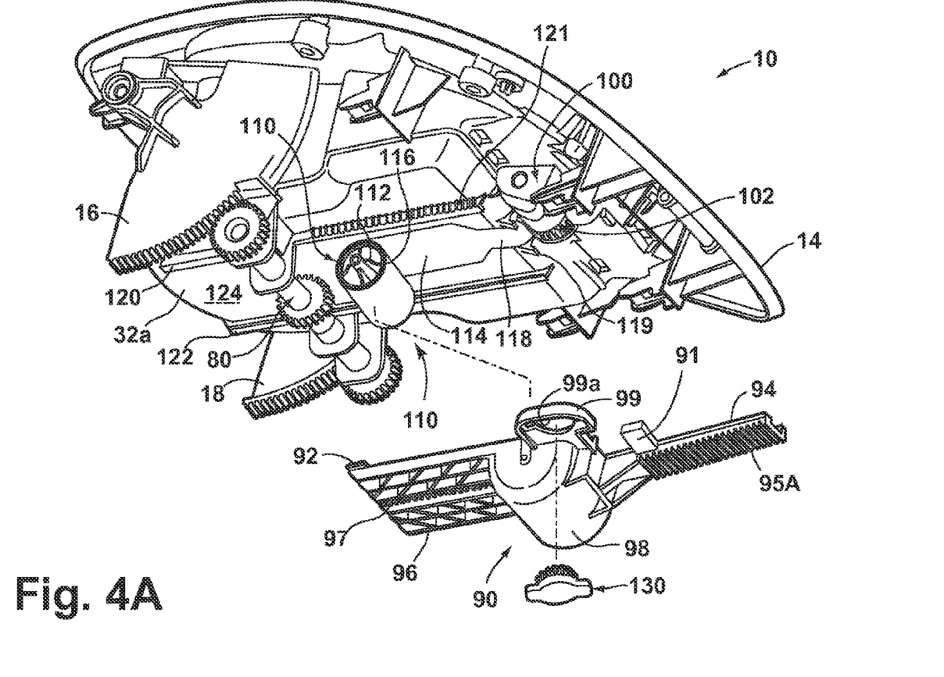
FIG. 4A is a bottom perspective view of another embodiment of a portable electronic device having a slide assembly exploded away therefrom.
Figure 4B:
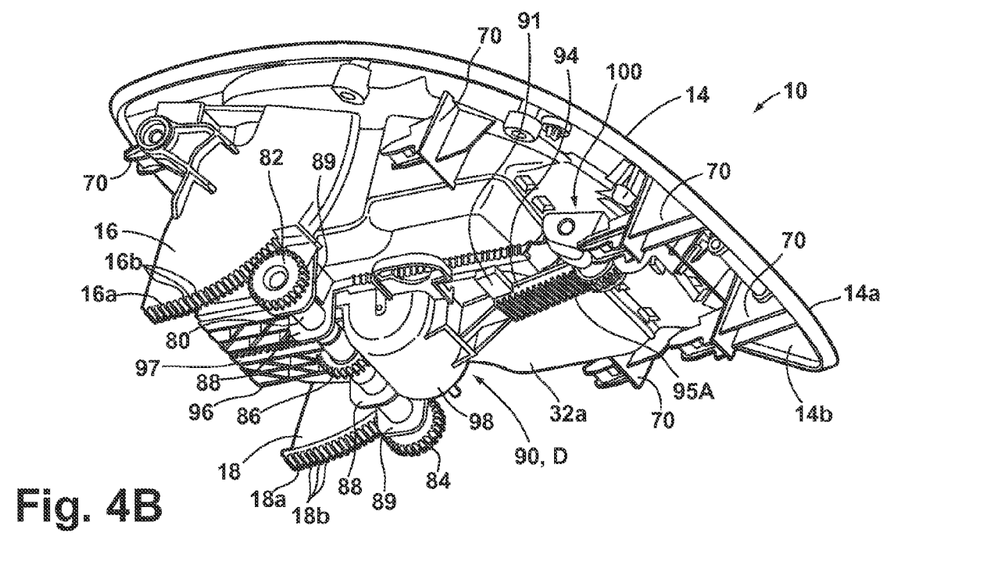
FIG. 4B is a bottom perspective view of the portable electronic device of FIG. 4A as assembled.
Figure 10:
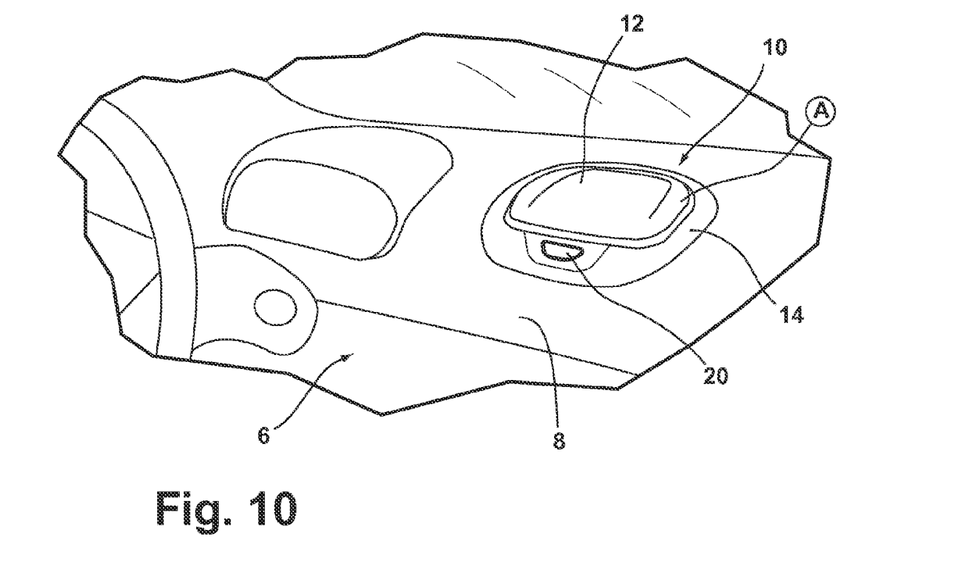
FIG. 10 is a fragmentary perspective view of a portable electronic device dock of FIG. 1 disposed in an instrument panel of a vehicle.
Figure 11:
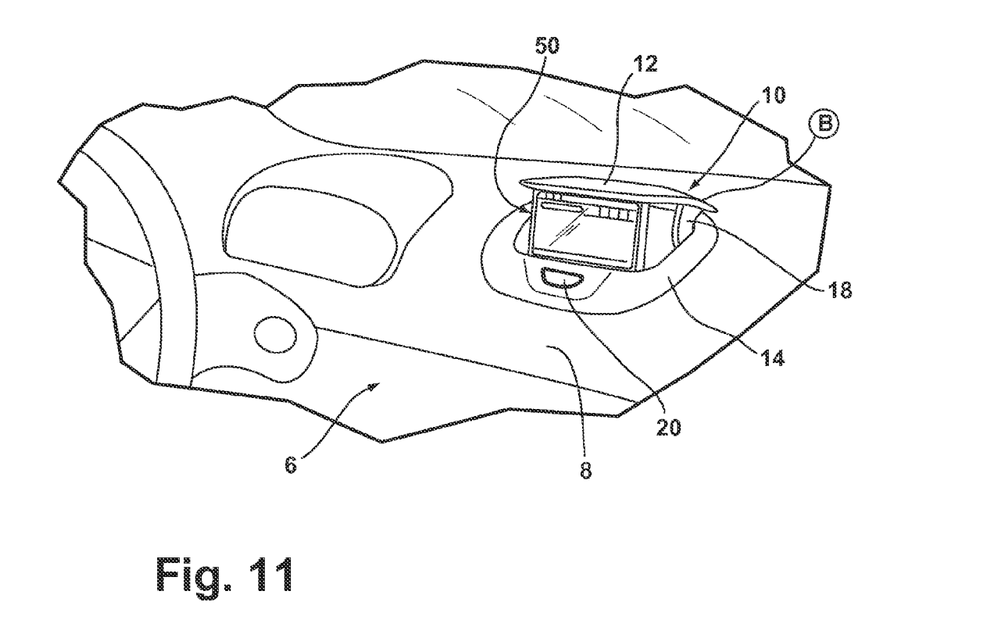
FIG. 11 is a fragmentary perspective view of the portable electronic device dock of FIG. 10 having a portable electronic device secured therein.

Referring now to FIGS. 4A and 4B, the device dock 10 is shown with the housing 14 having an upper portion 14a and a lower portion 14b. A plurality of clip members 70 are disposed around a perimeter of the housing 14 on the underside 14b. In assembly, the clip members 70 are adapted to retain the device dock 10 in an aperture disposed in a vehicle instrument panel, as best shown in FIGS. 10 and 11. As further shown in FIGS. 4A and 4B, the support arms 16, 18 include geared sector portions 16a, 18a respectively. The geared sector portions 16a, 18a of the support arms 16, 18 are arcuately-shaped sector portions having a plurality of spaced apart teeth 16b, 18b which are gearingly engaged with outer drive members 82, 84 disposed on opposite sides of an axle member 80. The axle member 80 further includes central drive member 86 which, like outer drive members 82, 84, is coupled to the axle member 80 and adapted to rotate with the axle member 80 as the lid 12 (FIG. 1) opens and closes. The axle member 80 is secured to an underside 32a of the storage compartment 30 (FIG. 2) by inner and outer bracket members 88, 89 which extend downwardly from the underside 32a of the storage compartment 30. Outer drive members 82, 84 are geared drive members which are adapted to drive the support arms 16, 18 as the lid 12 (FIG. 2) is moved between open and closed positions. Central drive member 86 is disposed between the outer drive members 82, 84, and is gearingly coupled to a slide assembly 90. While the lid 12 is shown in FIGS. 4A and 4B as being gearingly coupled to the outer drive members 82, 84 at support arms 16, 18, it is also contemplated that the lid can include a linkage member that is pivotally coupled to the slide 90 and pivotally coupled to the support arms 16, 18. This pivoting linkage coupling may be similar to a connecting rod in an internal combustion engine. Thus, it is contemplated that the linkage member is pinned to the supporting arms 16, 18 on a first end, and further coupled to the second portion 96 of the slide assembly 90 on a second end, such that as the slide assembly 90 is pulled rearward in vehicle when the clutch assembly 100 is released, the linkage member pulls the support arms 16, 18 rearward as well, thereby causing the lid 12 to open. Such a linkage system can be used to help eliminate play in the lid connection that could occur between the support arms 16, 18 and the outer drive members 82, 84 of axle member 80.

The slide assembly 90 is shown in FIG. 4B in a first position D which is a loaded position, as further described below. The slide assembly 90 includes first and second portions 94, 96 disposed on opposite sides of a housing portion 98. Both the first and second portions 94, 96 include racks 95A, 97, respectively. In assembly, rack 97 of the second portion 96 of the slide assembly 90 is a downwardly facing rack adapted to gearingly engage the central drive member 86. Further, in assembly, rack 95A of the first portion 94 of the slide assembly 90 is also a downwardly facing adapted to gearingly engage a clutch assembly 100, as further described below. Rack 95A may be a downwardly facing rack, as shown in FIGS. 4A, 4B, wherein the first portion 94 of the slide assembly 90 moves over the clutch assembly 100. Rack 95A may also be an upwardly facing rack, identified as reference numeral 95B in FIGS. 7A, 7B, 8B and 9, wherein the first portion 94 of the slide assembly 90 moves under the clutch assembly 100. With either rack configuration, the racks 95A and 95B are gearlingly engaged with the clutch assembly 100, as further described below. The clutch assembly 100 is adapted to retain the lid 12 in the clamped position C, as shown in FIG. 3 and further described below. The housing portion 98 of the slide assembly 90 is disposed between the first and second track portions 94, 96 and is configured to house a biasing mechanism 110 (FIG. 4A) to bias the slide assembly 90 towards a second position E or at-rest position, shown in FIG. 9, from the first or loaded position D shown in FIG. 4B. The first portion 94 of the slide assembly 90 includes a release tab 91 which extends perpendicularly outward from the first portion 94. The release tab 91 moves with the slide assembly 90 between first and second positions D, E, and is configured to engage a spring member, as further described below.

As operably coupled to one another in a geared arrangement, the clutch assembly 100, the slide assembly 90, the axle member 80 and the support arms 16, 18 are adapted to work in concert as the lid 12 is open and closed. This interconnected grouping of components provides for a device dock 10 having the ability to clamp a variety of portable electronic devices, such as the portable electronic device 50 shown in FIG. 3, in a display position for use by a vehicle occupant.

Figure 9:
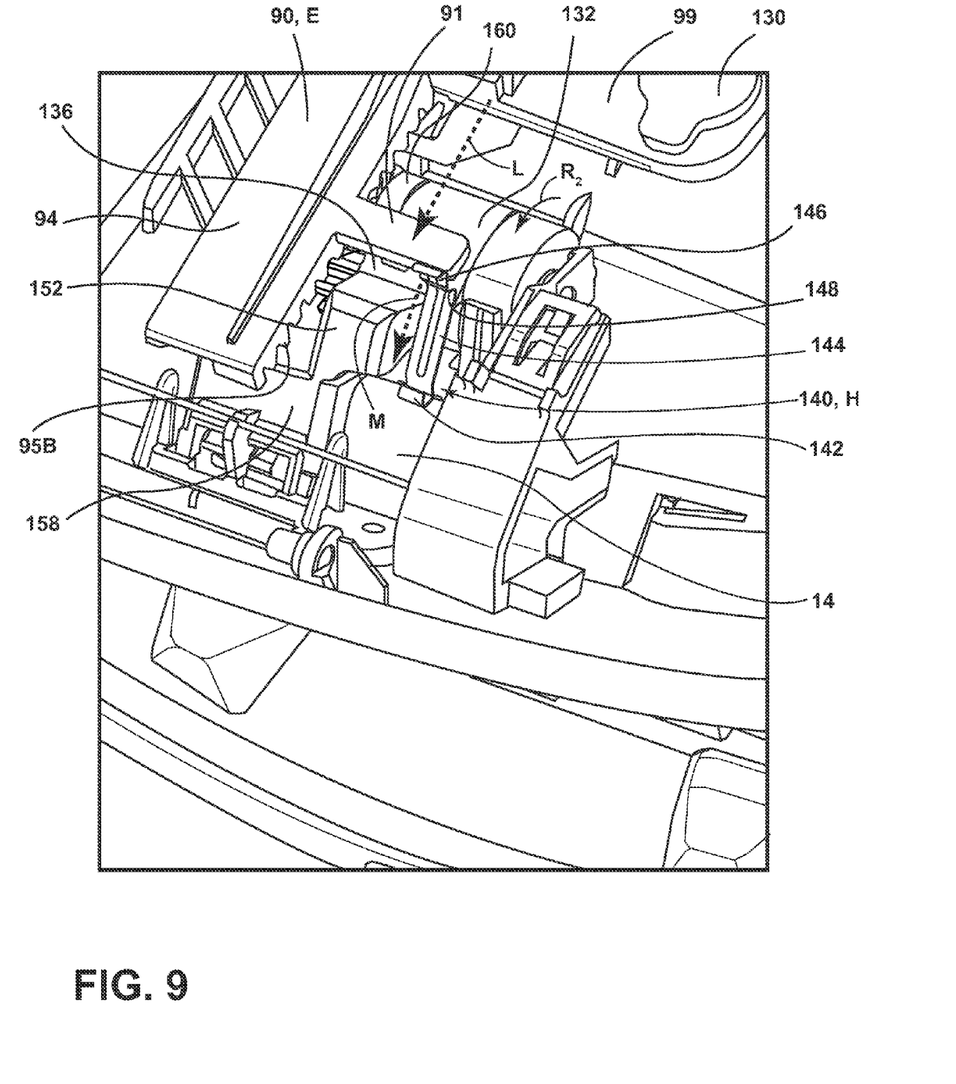
FIG. 9 is a fragmentary bottom perspective view of the clutch assembly and spring member with the clutch assembly in an engaged condition.

With further reference to FIGS. 4A, 4B and 9, the slide assembly 90 is adapted to move between the first position D (FIG. 4B) and the second position E (FIG. 9) along the underside 32a of the storage compartment 30 (FIG. 2). As described above, the first position D of the slide assembly 90 is considered a loaded position in that the biasing mechanism 110 is loaded and ready to pull the slide assembly 90 towards the second or at-rest position E (FIG. 9). The biasing mechanism 110, as shown in the embodiment of FIG. 4A, is a tape spring which is a constant force spring having a spool 112. The biasing mechanism 110 further includes a body portion 114 having a first end 116 coupled to the spool 112 and a second end 118 which acts as an anchor member coupled to a bracket member 119 disposed on the underside 32a of the storage compartment 30. In assembly, the spool 112 is housed within the housing portion 98 of the slide assembly 90 and the body portion 114 of the biasing mechanism 110 spools around the spool 112 as the slide assembly 90 moves towards the second position E (FIG. 9). As the slide assembly 90 moves to the first or loaded position D (FIG. 4B), the body portion 114 of the biasing mechanism 110 is rolled out, thereby imparting a load on the slide assembly 90 as coupled to the spool 112. As further shown in FIG. 4A, first and second retaining flanges 120, 122 extend downwardly from the underside 32a of the storage compartment 30 and generally include L-shaped cross-sections. In this way, the retaining flanges 120, 122 define a channel 124 disposed therebetween. The slide assembly 90 is slidably received in the channel 124 and includes tab members 92 disposed on opposite sides of the second track portion 96. In assembly, the tab members 92 are received in the retaining flanges 120, 122 to retain the slide assembly 90 in the channel 124. Thus, as received in the channel 124, the slide assembly 90 is captured between the axle member 80 and the underside 32a of the storage compartment 30 as shown in FIG. 4B. In this way, the slide assembly 90 is positively retained in the position shown in FIG. 4B for sliding movement therein. In the embodiment shown in FIG. 4B, the first retaining flange 120 further includes a track member 121 disposed along a side portion thereof. The track member 121 is adapted to engage a dampening mechanism 130 which, as shown in FIG. 4A, is adapted to be received in a dampener housing 99 at aperture 99a. It is contemplated that the dampening mechanism 130 is a viscous damper which is adapted to gearingly engage the track member 121 and rotate within the dampener housing 99 and dampen movement of the slides assembly 90 as the slide assembly 90 moves between the first and second positions D, E.

When the slide assembly 90 is in the first or loaded position D (FIG. 4B), the lid 12, as shown in FIG. 1, is in the closed position A. As the slide assembly 90 moves from the first position D to the second or at-rest position E (FIG. 9) under the force of the biasing mechanism, the lid 12 moves to the fully open position B shown in FIG. 2. As the slide assembly 90 so moves, the downwardly facing rack 97, disposed on the second portion 96 of the slide assembly 90, drives the central drive member 86 which thereby rotates the axle 80 and outer drive members 82, 84 to gearingly move the support arms 16, 18 upward, thereby moving the lid 12 to the open position B (FIG. 2). Thus, as a user pushes down on the open lid 12, the slide assembly 90 will move to the first or loaded position D as driven by the central drive member 86 which is gearingly coupled to the downwardly facing rack 97 disposed on the second portion 96 of the slide assembly 90. As the slide assembly 90 moves to the first or loaded position D, the biasing member 110 is loaded and ready to act on the slide assembly 90 to move the slide assembly 90 towards the second or at-rest position E.

Figure 5:
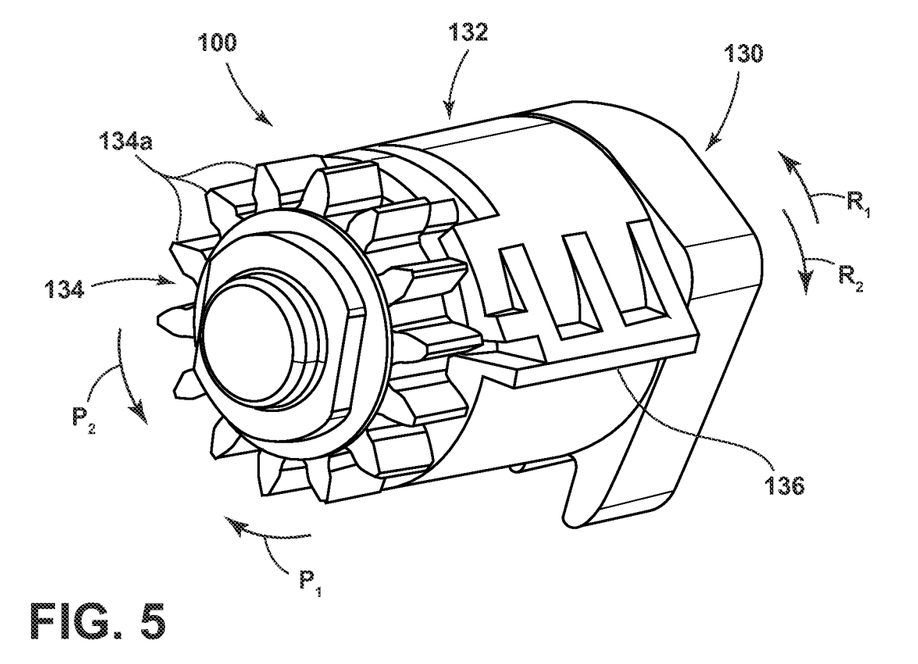
FIG. 5 is a bottom perspective view of the of a clutch assembly having a release sleeve.
Figure 7A:
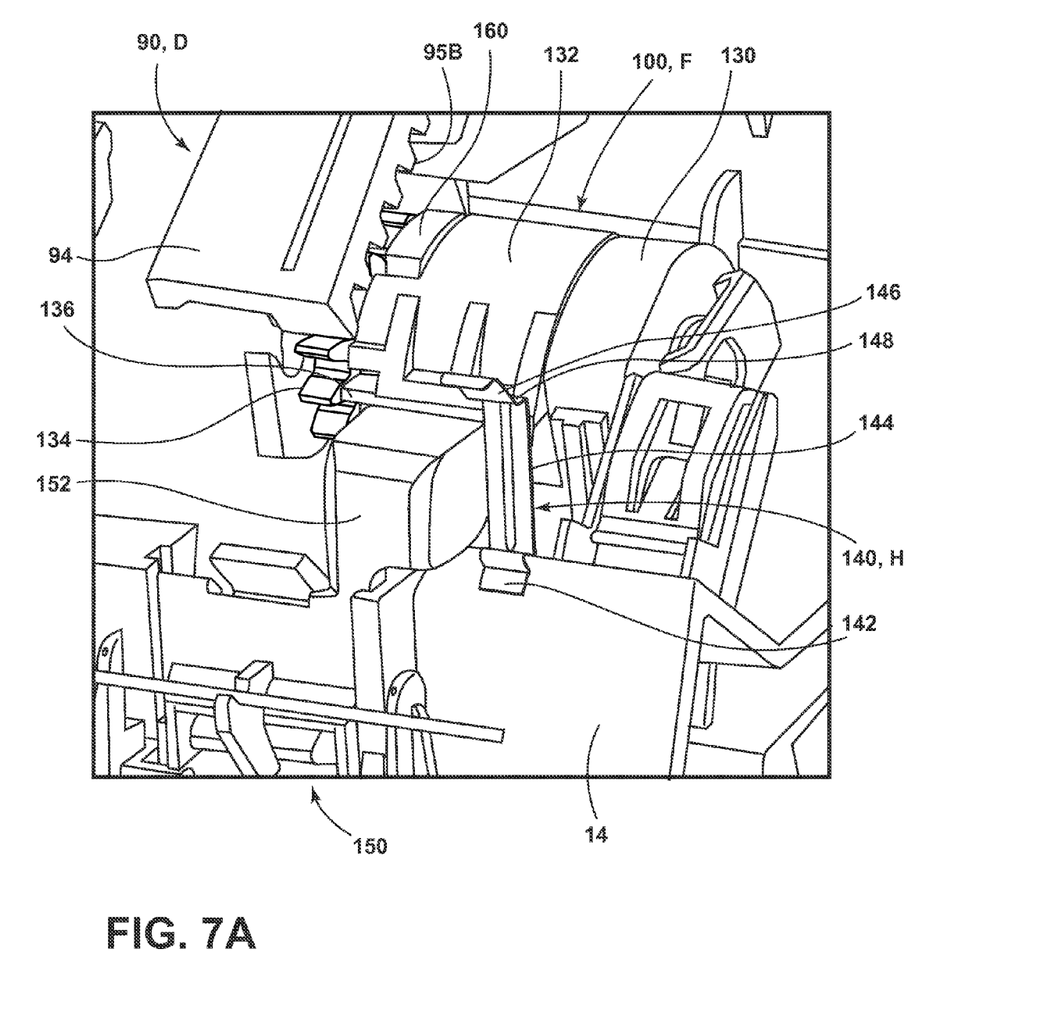
FIG. 7A is a fragmentary bottom perspective view of the clutch assembly and spring member as positioned in the device dock of FIG. 1 with the clutch in an engaged condition.
Figure 7B:
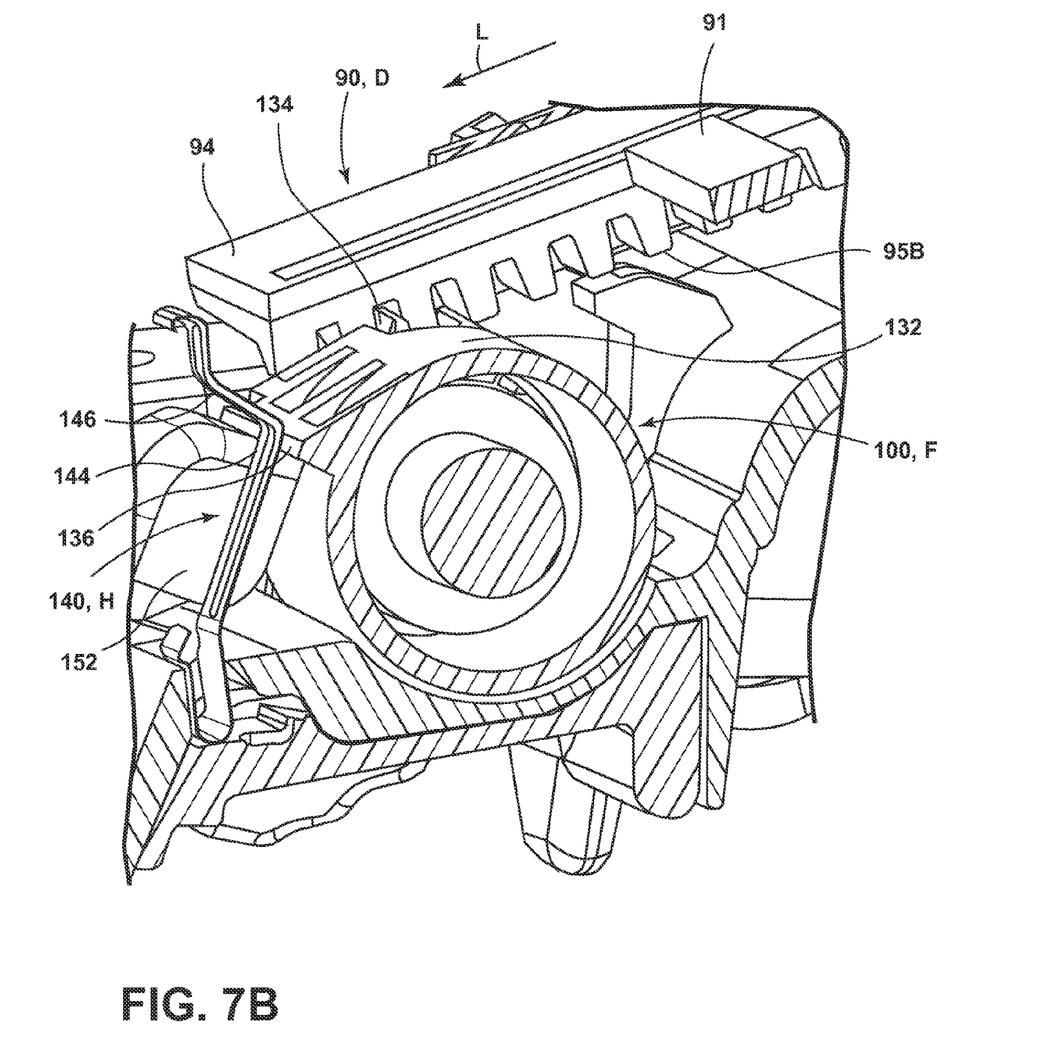
FIG. 7B is a cross-sectional view of the clutch assembly and spring member of FIG. 7A.

Referring now to FIG. 5, the clutch assembly 100 is shown having a mounting portion 130, a release sleeve 132 and a clutch gear 134. The release sleeve 132 includes a collar portion 136 which is configured to engage a portion of an actuator assembly as further described below. The clutch gear 134 includes a number of teeth 134a disposed therearound, which are configured to engage the upwardly facing rack 95B of the slide assembly as best shown in FIGS. 7A, 7B, 8B and 9. The release sleeve 132 is configured to rotate in a direction as indicated by arrow $R_1$ to release the clutch assembly 100, or otherwise stated, allow the clutch assembly 100 to slip during movement of the lid 12 towards the fully open position B (FIG. 2). Thus, the clutch assembly 100 is configurable between engaged and released conditions. In FIGS. 7A and 7B, the clutch assembly 100 is shown in the engaged condition F, wherein the clutch assembly 100 will only allow the clutch gear 134 to rotate in a direction as indicated by arrow $P_2$, which is consistent with the slide assembly 90 being moved to the first or loaded position D (FIG. 4B), which is further consistent with a user closing the lid 12 (FIG. 1). In this way, the clutch assembly 100 can be used to cinch down on a portable electronic device 50 as shown in FIG. 3. In the engaged condition F, the clutch assembly 100 will not allow the clutch gear 134 to rotate in a direction as indicated by arrow $P_1$, such that the lid 12 will remain cinched or clamped against the electronic device 50 in a clamped position C, as shown in FIG. 3, and will not move to the open position B (FIG. 2), while the clutch assembly is in the engaged condition F. In FIGS. 8B and 9, the clutch assembly 100 is shown in the released condition G, wherein the clutch assembly 100 will allow the clutch gear 134 to rotate in a direction as indicated by arrow $P_1$, which is consistent with the slide assembly 90 being moved to the at-rest position E (FIG. 9), as biased thereto, which is further consistent with a user having actuated the lid 12 for movement to the fully open position B (FIG. 2). Thus, the release sleeve 132 can be rotated in a direction as indicated by arrow $R_1$ to release the clutch assembly 100 for movement of the clutch gear 134 in a direction as indicated by arrow $P_1$ to allow the lid to open. The release sleeve 132 is rotated in the direction as indicated by arrow $R_1$ by interaction with the collar portion 136 in an actuation assembly, as further described below with reference to FIG. 8. When the actuation assembly 150 is no longer acting on the collar portion 136 of the release sleeve 132, the release sleeve 132 will rotate in a direction as indicated by arrow $R_2$, thereby converting the clutch assembly 100 from the released condition G to the engaged condition F. It is contemplated that the clutch assembly 100 is biased towards the engaged condition F as the release sleeve 132 is biased for rotation in the direction as indicated by arrow $R_2$. Thus, the clutch assembly 100 is configured to revert to the engaged condition F from the released condition G when the release sleeve 132 is released. As noted above, when the clutch assembly 100 is in the engaged condition F, the clutch gear 134 can only be rotated in a direction as indicated by arrow $P_2$ for closing the lid 12 in an incremental manner towards the closed position A (FIG. 1) or a clamped position C (FIG. 3) to retain an electronic device 50.

Figure 6:
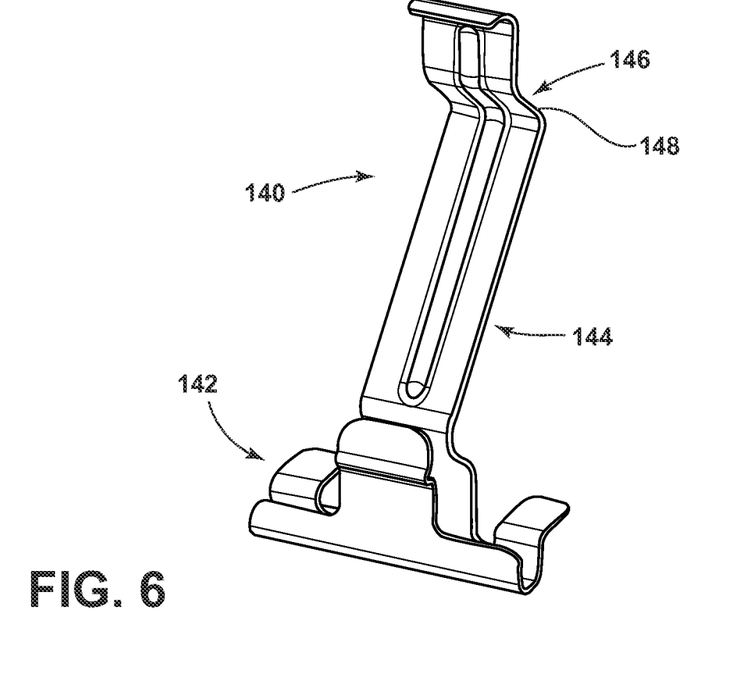
FIG. 6 is a bottom perspective view of the of a spring member.

Referring now to FIG. 6, a spring member 140 is shown having a mounting portion 142 in the form of a clip, for mounting the spring member 140 to the housing 14 of the device dock 10, and an engagement arm 144 having an engagement end 146 which is configured to engage the collar portion 136 of the release sleeve 132 in use. The engagement end 146 further includes a notch 148 that engages the collar portion 136 of the release sleeve 132

Referring now to FIG. 7A, the spring member 140 is shown coupled to the housing 14 at mounting portion 142. The clutch assembly 100 is further mounted to the housing 14 at mounting portion 130 and is gearingly engaged with the first portion 94 of the slide assembly 90 by the interaction of upwardly facing rack 95B and clutch gear 134. The slide assembly 90 is in the first or loaded position D and retained in this position via the clutch assembly 100. As mounted to the housing 14, the spring member 140 is in a first or loaded position H, wherein the engagement arm 144 extends outwardly towards the clutch assembly 100, such that the engagement end 146 abuts the collar portion 136 of the release sleeve 132 of the clutch assembly 100. The spring member 140 remains in the first or loaded position H until the release sleeve 132 is rotated in a direction as indicated by arrow $R_1$ (FIG. 5) by the actuator assembly 150. The actuator assembly 150 includes an abutment member 152 which, as shown in FIG. 7A, abuts the collar portion 136 of the release sleeve 132. In assembly, the abutment portion 152 of the actuator assembly 150 is configured to push or rotate the release sleeve 132 in the direction as indicated by arrow $R_1$ to convert the clutch assembly 100 to the released condition G for opening the lid 12, as further described below.

Referring now to FIG. 7B, the abutment member 152 of the actuator assembly 150 is better shown engaged with the collar portion 136 of release sleeve 132 of the clutch assembly 100. Further, the spring member 140 is in the first or loaded position H wherein the engagement end 146 of arm 144 is resting against, but not engaged with, collar portion 136 of release sleeve 132. As further shown in FIG. 7B, the release tab 91 of the slide assembly 90 is aligned with the engagement end 146 of the spring member 140. Thus, as the slide assembly 90 moves from the first position D to the second position E along the path as indicated by arrow L, the release tab 91 will engage the engagement end 146 of the spring member 140, as further described below.

Figure 8A:
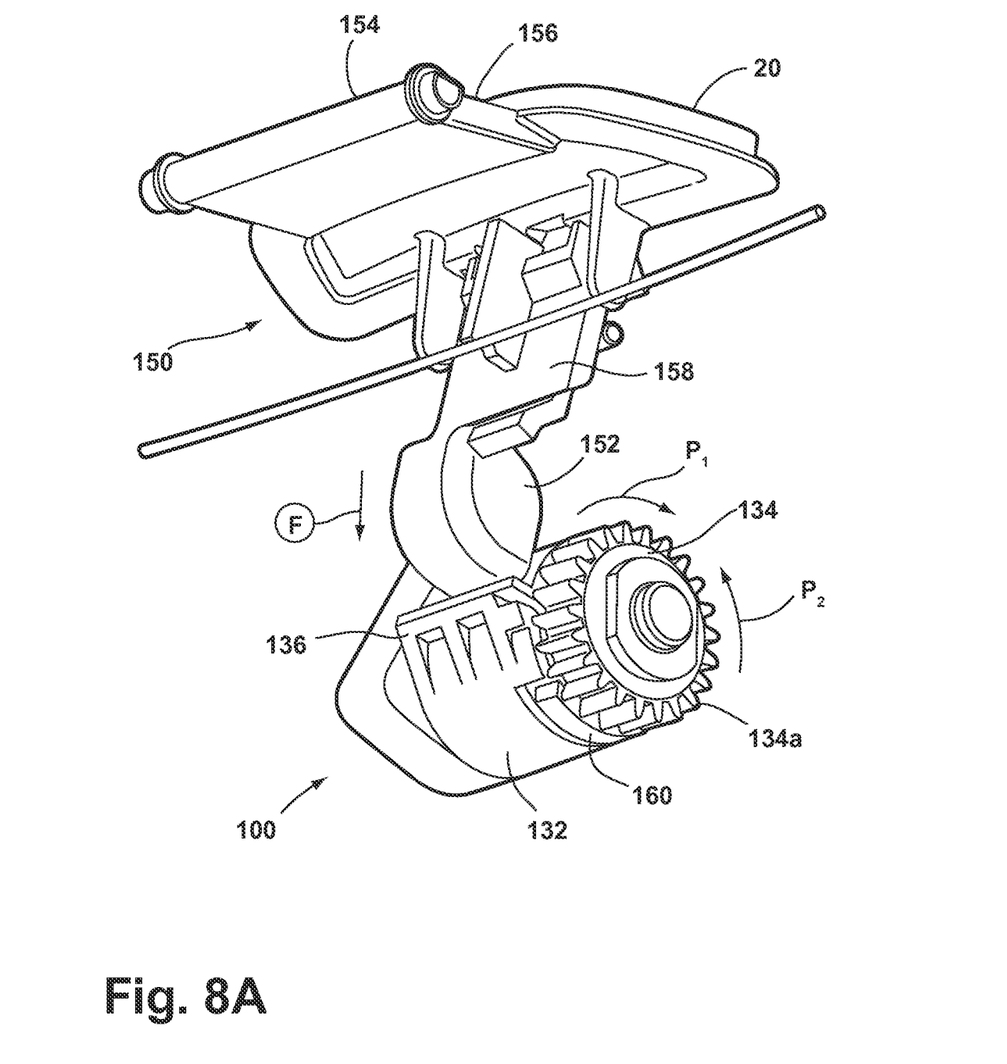
FIG. 8A is a perspective view of the clutch assembly of FIG. 5 as coupled to an actuator assembly.
Figure 8B:
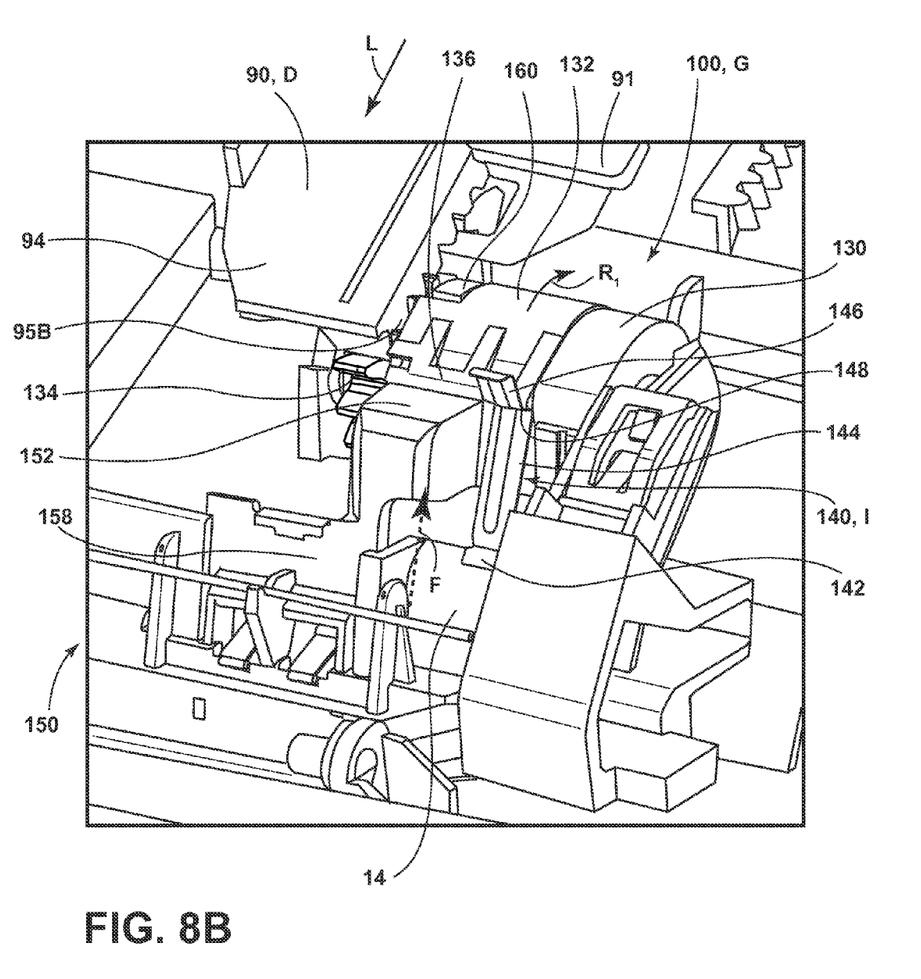
FIG. 8B is a fragmentary bottom perspective view of the clutch assembly and spring member as positioned in the device dock of FIG. 1 with the clutch assembly in a released condition.

Referring now to FIG. 8A, the actuator assembly 150 includes the actuator button 20 which is hingedly connected to the underside of the housing 14b (FIG. 4B) by a hinged coupling 154 having a support arm 156 which is directly coupled to the actuator button 20. The actuator button 20 further includes an arm 158 extending outwardly therefrom with the abutment member 152 positioned thereon. In assembly, the abutment member 152 is adapted to abut the collar portion 136 disposed on the clutch release sleeve 130 which is engaged with a spring member 160. Thus, as the lid 12 of the device dock 10 is pushed downward to the closed position A, shown in FIG. 1, the slide assembly 90 moves in a car-forward direction away from the clutch assembly 100 to the loaded position D, shown in FIG. 4B. This movement of the slide assembly 90 moves the slide assembly 90 away from the clutch assembly 100, thereby rolling out the constant force tape spring of biasing mechanism 110 (FIG. 4A), and further rotates the clutch gear 134 in a direction as indicated by arrow $P_2$. Thus, the clutch gear 134 slips in the direction indicated by arrow $P_2$ as the upwardly facing rack 95B of the slide assembly 90 moves in a car-forward direction. When the user stops pushing down on the lid 12 of the device dock 10, the clutch assembly 100 prevents the slide assembly 90 from moving back to the at-rest position E (FIG. 9), such that the lid 12 will remain in a clamped position C on a portable electronic device, such as portable electronic device 50 shown in FIG. 3. Thus, the clutch gear 134 is adapted to lock on the upwardly facing rack 95B of the first portion 94 of the slide assembly 90 as the slide assembly 90 is biased by the biasing mechanism 110 to the at-rest position E, to retain the lid 12 in the clamped position C. When the user wishes to remove the portable electronic device 50 from the device dock 10, the user will press downwardly on the actuator button 20 to move the abutment member 152 in a direction as indicated by arrow F to release the clutch release sleeve 132 via engagement with the collar portion 136, such that the clutch gear 134 is converted to the released condition G from the engaged condition F, and therefore free to rotate in the direction as indicated by $P_1$, which is the direction the clutch gear 134 will rotate as the biasing mechanism 110 pulls the slide assembly 90 towards the clutch assembly 100, thereby causing the lid 12 to open and release the portable electronic device 50.

Referring now to FIG. 8B, it is contemplated that the user has pushed the actuator button 20 to move the abutment member 152 in the direction as indicated by arrow F to release the clutch assembly 100 to the released condition G by rotating the release sleeve 132 in a direction as indicated by arrow $R_1$, via engagement of the abutment member 152 with the collar portion 136 of the release sleeve 132. With the clutch assembly 100 in the released condition G, the clutch gear 134 is free to rotate or slip in the direction as indicated by $P_1$ (FIG. 8A), thereby allowing the slide assembly 90 to move towards the at-rest or second position E in the direction indicated by arrow L as biased thereto. As the abutment member 152 rotates the release sleeve 132 in the direction as indicated by arrow $R_1$, the spring member 140 moves from the loaded position H (FIGS. 7A, 7B) to the engaged position I. In the engaged position I, the spring member 140 is engaged with the collar portion 136 of the release sleeve 132 at notch 148, to keep the release sleeve 132 positioned against spring 160, such that the clutch assembly 100 remains in the released condition G as the slide assembly 90 moves towards the at-rest or second position E (FIG. 9). With the spring member 140 engaged with the collar portion 136 of the release sleeve 132 at notch 148 to keep the clutch assembly 100 in the released condition G, slide assembly 90 can fully move from the first or loaded position (FIG. 8B) towards the at-rest or second position E (FIG. 9) in the direction indicated by arrow L. As described above, this movement of the slide assembly 90 towards the clutch mechanism is in concert with the lid 12 moving to the fully open position B as shown in FIG. 2. Thus, the spring member 140 being engaged with the release sleeve 132 allows a user to push the actuator button 20 one time in order to move the clutch assembly 100 to the released condition G, and retain the clutch mechanism in this condition with the spring member 140 as the lid 12 opens. Once the lid 12 has moved to the fully open position B, as shown in FIG. 2, the clutch assembly 100 must be converted back to the engaged condition F (FIGS. 7A, 7B), so that the user can clamp the lid down on an electronic device, such as shown in FIG. 3. This conversion occurs by the movement of the slide assembly 90 as further described below with reference to FIG. 9.

Referring now to FIG. 9, the slide assembly 90 has moved from the first or loaded position D to the at-rest or second position E in the direction indicated by arrow L. As the slide assembly 90 moves to the second position E, the release tab 91 disposed on the first portion 94 of the slide assembly 90 moves towards the engagement end 146 of spring member 140. In FIG. 9, the release tab 91 has contacted the engagement end 146 of spring member 140 to move the spring member 140 in a direction as indicated by arrow M. This movement of the spring member 140 releases the spring member 140 from its engagement with collar portion 136 of release sleeve 132. The release sleeve 132 is now free to rotate in the direction as indicated by arrow R$_2$, towards abutment with abutment member 152 of the actuator assembly 150. In this way, the clutch assembly 100 reverts back to the engaged condition F, such that the lid 12 is ready to be cinched or clamped against a portable electronic device, as shown in FIG. 3. Thus, by pressing the actuator button 20 one time, the user of the device dock 10 has allowed the lid 12 to fully open from the closed position A (FIG. 1) to the open position B (FIG. 2). This is because, as described above, the spring member 140 engages and retains the release sleeve 132 of the clutch assembly 100 to retain the clutch assembly 100 in the released condition G as the lid 12 fully opens. As the lid 12 nears the fully open position B, the slide assembly 90 moves towards the clutch assembly 100, such that the release tab 91 of the slide assembly 90 engages the engagement end 146 of the spring member 140 to release the spring member 140 from its engaged position I (FIG. 8B) with the release sleeve 132. Thus, it is contemplated that the biasing mechanism 110 (FIG. 4A) of the slide assembly 90 provides enough force to overcome the spring force of the spring member 140 so as to release the spring member 140 from the collar portion 136 of the release sleeve 132 by moving the spring member 140 in the direction indicated by arrow M. By releasing the spring member 140, the clutch assembly 100 is converted back to the engaged condition F for selectively moving the lid 12 downward towards a clamped position C (FIG. 3), or towards the fully closed position A (FIG. 1). As the user closes the lid 12, the slide assembly 90 will load and move away from the clutch assembly 100 to the loaded position D, thereby allowing the spring member 140 to again rest against the collar portion 136 of the release sleeve 132, but not engage the release sleeve 132, in a manner as shown in FIGS. 7A, 7B.

Referring now to FIGS. 10 and 11, the device dock 10 is shown disposed within a vehicle interior 6 on an instrument panel 8. Thus, the device dock 10 of the present invention is adapted to be disposed directly on the instrument panel 8 within a vehicle interior 6 to seamlessly integrate the device dock 10 within the vehicle interior 6.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A device dock, comprising:
   a storage compartment having a pivoting lid;
   a slide assembly operably coupled to the lid having a release tab;
   a clutch assembly gearingly engaged with the slide assembly having a release sleeve; and
   a spring member operable between engaged and released positions with the release sleeve, wherein the spring member is moved to the released position by the release tab when the lid is moved to a fully open position.

2. The device dock of claim 1, wherein the slide assembly moves to a loaded position as the lid moves to a closed position.

3. The device dock of claim 2, wherein the slide assembly is configured to bias the lid towards the fully open position as the slide assembly moves from the loaded position to an at-rest position.

4. The device dock of claim 3, wherein the clutch assembly is operable between engaged and released conditions, wherein the lid moves towards the fully open position when the clutch assembly is in the released condition, and further wherein the lid is configured to be retained in a clamped position when the clutch assembly is in the engaged condition.

5. The device dock of claim 1, including:
   an actuator assembly operably coupled to a housing of the storage compartment having an actuator button connected to an abutment member, wherein the abutment member engages a collar portion of the release sleeve of the clutch assembly to move the clutch assembly from an engaged condition to a released condition when the actuator button is pressed.

6. The device dock of claim 5, wherein the spring member moves to the engaged position with the collar portion of the release sleeve when the actuator button is pressed to retain the clutch assembly in the released condition as the lid moves to the fully open position.

7. The device dock of claim 6, wherein the lid moves towards the fully open position when the clutch assembly is in the released condition as biased by the slide assembly.

8. The device dock of claim 6, wherein the slide assembly is configured to bias the lid towards the fully open position as the slide assembly slideably moves from a loaded position to an at-rest position, and further wherein the release tab engages the spring member when the lid is in the fully open position, such that the spring member releases the collar portion of the release sleeve, thereby allowing the clutch assembly to revert from the released condition to the engaged condition.

9. A device dock, comprising:
   a storage compartment having lid operable between open, closed and clamped positions;
   a slide assembly operably coupled to the lid;
   a clutch assembly gearingly engaged with the slide assembly between engaged and released conditions; and
   a spring member operable between engaged and released positions with the clutch assembly, wherein the spring member retains the clutch assembly in the released position as the lid moves to the open position.

10. The device dock of claim 9, wherein the lid is retained in place when the clutch assembly is in the engaged condition and further wherein the lid moves towards the open position when the clutch assembly is in the released condition as biased by the slide assembly.

11. The device dock of claim 10, including:
   an actuator assembly operably coupled to the storage compartment and configured to move the clutch assembly from the engaged condition to the released condition.

12. The device dock of claim 11, including:
   a release tab disposed on the slide assembly.

13. The device dock of claim 12, wherein the slide assembly moves from a loaded position to an at-rest position as the lid moves from the closed position to the open position, and further wherein the release tab engages the spring member when the lid is in the fully open position to move the spring member from the engaged position to the released position, thereby allowing the clutch assembly to revert from the released condition to the engaged condition.

14. The device dock of claim 13, wherein the clutch assembly is configured to retain the lid in the clamped position to clamp a portable electronic device between the lid and the storage compartment.

15. A device dock, comprising:
   a storage compartment having a slide assembly operably coupled to a lid, wherein the slide assembly includes a release tab;
   a clutch assembly operably coupled to the slide assembly, the clutch assembly operable between engaged and released conditions, wherein the clutch assembly includes a release sleeve and is configured to retain the lid in a clamped position on an electronic device in the engaged condition; and
   a spring member operably coupled to the storage compartment having an arm with a notch disposed on an engagement end thereof, wherein the engagement end is operable between engaged and released positions and configured to retain the clutch assembly in the released condition as the lid is moved to a fully open position, and further wherein the engagement end is moved from the engaged position to the released position by the release tab of the slide assembly when the lid is in the fully open position.

16. The device dock of claim 15, including:
   first and second retaining flanges disposed on an underside of the storage compartment, the first and second retaining flanges defining a channel, wherein the slide assembly is slideably received in the channel between at-rest and loaded positions.

17. The device dock of claim 16, wherein the slide assembly includes a first portion and a second portion, each portion of the slide assembly including a rack.

18. The device dock of claim 17, including:
   a housing portion disposed on the slide assembly between the first and second portions of the slide assembly; and
   a biasing mechanism housed in the housing portion wherein the biasing mechanism is loaded as the slide assembly is moved from an at-rest position to a loaded position as the lid moves from the fully open position towards a closed position.

19. The device dock of claim 18, wherein the clutch assembly includes a clutch gear that is gearlingly engaged with the rack of the first portion of the slide assembly.

20. The device dock of claim 19, including:
   an actuator assembly operably coupled to a housing of the storage compartment and configured to move the release sleeve of the clutch assembly for converting the clutch assembly between the engaged and released conditions.

* * * * *